United States Patent
Thörn (10) Patent No.: US 8,111,247 B2
(45) Date of Patent: Feb. 7, 2012

(54) SYSTEM AND METHOD FOR CHANGING TOUCH SCREEN FUNCTIONALITY

(75) Inventor: Karl Ola Thörn, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 396 days.

(21) Appl. No.: 12/412,583

(22) Filed: Mar. 27, 2009

(65) Prior Publication Data
US 2010/0245287 A1 Sep. 30, 2010

(51) Int. Cl.
*G06F 3/041* (2006.01)

(52) U.S. Cl. ......................... 345/173; 345/175

(58) Field of Classification Search .................. None
See application file for complete search history.

(56) References Cited

U.S. PATENT DOCUMENTS

| | | | |
|---|---|---|---|
| 5,617,407 A * | 4/1997 | Bareis | 369/275.3 |
| 5,794,205 A * | 8/1998 | Walters et al. | 704/275 |
| 6,531,999 B1 * | 3/2003 | Trajkovic | 345/157 |
| 7,110,666 B2 * | 9/2006 | Abe et al. | 396/59 |
| 7,499,074 B2 * | 3/2009 | Kim et al. | 348/14.02 |
| 2001/0030695 A1 * | 10/2001 | Prabhu et al. | 348/232 |
| 2003/0163623 A1 * | 8/2003 | Yeung | 710/300 |
| 2006/0044396 A1 * | 3/2006 | Miyashita et al. | 348/207.99 |
| 2006/0140620 A1 * | 6/2006 | Fujii | 396/287 |
| 2007/0019000 A1 * | 1/2007 | Motomura et al. | 345/619 |
| 2007/0040810 A1 * | 2/2007 | Dowe et al. | 345/173 |
| 2007/0052686 A1 * | 3/2007 | Nomura | 345/173 |
| 2007/0140532 A1 * | 6/2007 | Goffin | 382/118 |
| 2007/0279482 A1 * | 12/2007 | Oswald et al. | 348/14.02 |
| 2008/0080846 A1 * | 4/2008 | Grip | 396/51 |
| 2008/0119237 A1 * | 5/2008 | Kim | 455/566 |
| 2008/0300884 A1 * | 12/2008 | Smith | 704/270.1 |
| 2009/0102805 A1 * | 4/2009 | Meijer et al. | 345/173 |
| 2009/0322671 A1 * | 12/2009 | Scott et al. | 345/156 |

FOREIGN PATENT DOCUMENTS

EP 1923778 5/2008

OTHER PUBLICATIONS

International Search Report and Written Opinion from corresponding International Application No. PCT/IB09/006882.
International Preliminary Report on Patentability from corresponding International Application No. PCT/IB09/006882.
"SteadyCam Premium", Dec. 15, 2008, XP55001435.

* cited by examiner

*Primary Examiner* — Paul Huber
(74) *Attorney, Agent, or Firm* — Renner, Otto, Boisselle & Sklar, LLP (57) ABSTRACT

A system and method changes touch screen functionality based on whether a user is detected during camera operation. A first camera generates a video signal containing a representation of at least a portion of a scene within a field of view of the first camera. A controller analyzes the video signal to determine whether one or more physical features of a user of the electronic device are present within the field of view of the first camera. A touch input device includes one or more touch points for receiving user input, each touch point being associated with controlling a respective one of a plurality of functions of the second camera. At least one of the touch points is associated with controlling a shutter function of a second camera, and a total number of touch points is dependent upon a result of the video signal analysis made by the controller.

18 Claims, 4 Drawing Sheets

SYSTEM AND METHOD FOR CHANGING TOUCH SCREEN FUNCTIONALITY

TECHNICAL FIELD OF THE INVENTION

The technology of the present disclosure relates generally to touch input devices for electronic devices and, more particularly, to a system and method for changing the functionality of a touch screen during camera operation.

BACKGROUND

Mobile and/or wireless electronic devices, such as, e.g., mobile telephones, portable media players, and portable gaming devices, are now in widespread use. In addition, the features associated with certain types of electronic devices have become increasingly diverse. For example, many mobile telephones include cameras that are capable of capturing still images and video images.

Some portable electronic devices, such as mobile telephones, rely on touch screen technology to receive user input. Touch screen technology typically relies on a transparent touch sensitive sensor located above a display. The touch sensitive sensor is able to detect the presence and movement of a user's finger or fingertip against or near the sensor surface. A user may control a specific function of the electronic device by touching a point on the touch screen. The touch point may be designated by displayed content. For example, in order to capture an image, the user may touch an area of the touch screen that overlays a shutter symbol presented on the display.

Some electronic devices with touch screen technology may have a dedicated shutter key that allows the user to easily capture an image by pressing a single, stand-alone button. A dedicated shutter key allows the user to immediately access the camera function of the electronic device, instead of scrolling through menu options to reach the camera feature. However, each dedicated button on an electronic device increases the manufacturing cost of the device. Therefore, it may be desirable to decrease the number of mechanical buttons on an electronic device.

SUMMARY

The present disclosure recognizes that in some scenarios, a touch screen may be difficult to use or access. For example, many mobile telephones with touch screen functionality include a built-in camera on one side of the phone and a display on the opposite side of the phone. As such, while taking a picture of oneself, a user may be required to position the phone in front of the user's face so that the display/touch screen is not visible to the user. If the mobile telephone does not include a dedicated shutter key, as is typical, the user has the difficult task of trying to touch the shutter symbol on the touch screen without looking at the display. As will be appreciated, the smaller the shutter symbol, the harder it becomes for the user to blindly access (e.g., touch without looking) the corresponding point on the touch screen. On the other hand, the larger the shutter symbol, the less screen space there is for displaying content associated with other features of the camera and/or the mobile telephone. For example, during camera operation the touch screen may display content related to adjusting the flash, zoom, or focus functions of the camera.

To enhance a shutter function on an electronic device having touch screen functionality, the present disclosure describes a system and method for changing the functionality of the touch screen during camera operation based on whether a user is detected as facing the touch screen. In one embodiment, if the user is not detected as facing the touch screen, the entire touch screen may be configured to control a shutter function of the camera, such that the user may capture an image while facing away from the touch screen (e.g., while facing the camera) by blindly touching any portion of the touch screen. If the user is detected as facing the touch screen, the touch screen may be configured to function as a typical graphical user interface for controlling camera operation. As such, according to the present disclosure, the functionality of a touch screen during camera operation may be configured to satisfy the operational needs of the user at the time of capturing an image.

According to one aspect of the disclosure, an electronic device includes a first camera that generates a video signal containing a representation of at least a portion of a scene within a field of view of the first camera; a second camera that captures an image upon receiving user input associated with controlling a shutter function of the second camera, the image representing at least a portion of a scene within a field of view of the second camera; a controller that acquires the video signal from the first camera and analyzes the video signal to determine whether one or more physical features of a user of the electronic device are present within the field of view of the first camera; and a touch input device operatively coupled to the controller and configured to include one or more touch points for receiving user input on a surface area of the touch input device, each touch point being associated with controlling a respective one of a plurality of functions of the second camera. According to this aspect of the disclosure, at least one of the touch points on the touch input device is associated with controlling the shutter function of the second camera, and a total number of touch points on the touch input device is dependent upon a result of the video signal analysis made by the controller.

According to one embodiment of the electronic device, upon a determination that no physical features are present within the field of view of the first camera, the controller configures the entire surface area of the touch input device to operate as the at least one touch point associated with controlling the shutter function.

According to one embodiment of the electronic device, upon a determination that no physical features are present within the field of view of the first camera, the controller configures a majority portion of the surface area of the touch input device to operate as the at least one touch point associated with controlling the shutter function and configures a remaining minority portion of the surface area of the touch input device to include a selection of touch points.

According to one embodiment of the electronic device, the electronic device further includes a database that includes camera feature information for each touch point on the touch input device, wherein upon receipt of user touch input at a selected touch point, the camera feature information associated with the selected touch point is verbally presented to the user.

According to one embodiment of the electronic device, upon a determination that physical features are present within the field of view of the first camera, the controller configures the touch input device to include a plurality of touch points that are associated with controlling respective functions of the second camera.

According to one embodiment of the electronic device, the physical features include one or more facial features of the user.

According to one embodiment of the electronic device, the electronic device further includes a memory that stores previously obtained user identity information including one or more facial features of the user, wherein upon a determination that facial features are present within the field of view of the first camera, the controller retrieves the user identity information from the memory to determine whether the facial features present within the field of view of the first camera match the one or more facial features included in the user identity information.

According to one embodiment of the electronic device, if a match is not made, the controller configures the entire surface of the touch input device to operate as the at least one touch point associated with controlling the shutter function.

According to one embodiment of the electronic device, the electronic device further includes a display disposed under the touch input device, the display being configured as a viewfinder to display a preview video signal that contains a representation of at least a portion of the scene that is within the field of view of the second camera. According to this embodiment, the controller is configured to analyze the preview video signal to determine whether one or more physical features of the user are present within the field of view of the second camera.

According to one embodiment of the electronic device, upon a determination that physical features are not present within the field of view of the first camera and upon a determination that physical features are present within the field of view of the second camera, the controller configures the entire surface of the touch input device to operate as the at least one touch point associated with controlling the shutter function.

According to one embodiment of the electronic device, upon a determination that physical features are not present within the field of view of the first camera and upon a determination that physical features are not present within the field of view of the second camera, the controller configures the touch input device to include a plurality of touch points that are associated with controlling respective functions of the second camera.

According to one embodiment of the electronic device, the electronic device further includes a memory that stores previously obtained user identity information including one or more facial features of the user.

According to one embodiment of the electronic device, upon a determination that physical features are present within the field of view of the second camera, the controller retrieves the user identity information and determines whether the physical features present within the field of view of the second camera match the one or more facial features included in the user identity information, and if a match is made, the controller configures the entire surface of the touch input device to operate as the at least one touch point associated with controlling the shutter function.

According to one embodiment of the electronic device, the field of view of the first camera has a generally opposite direction from the field of view of the second camera.

According to one embodiment of the electronic device, upon receipt of a user command to begin operation of the second camera, the controller automatically begins operation of the first camera and the analysis of the video signal generated by the first camera.

According to one embodiment of the electronic device, the functions of the second camera include at least one of a camera mode, a video mode, a flash setting, a zoom function, or a focus setting.

According to another aspect of the disclosure, a method of changing a touch screen functionality of an electronic device that includes a first camera, a second camera, and a touch input device includes the steps of acquiring a video signal containing a representation of at least a portion of a scene within a field of view of the first camera; analyzing the video signal to determine whether one or more physical features of a user of the electronic device are present within the field of view of the first camera; and based on a result of the video signal analysis, providing one or more touch points on the touch input device for receiving user input on a surface area of the touch input device, each touch point being associated with controlling a respective one of a plurality of functions of the second camera. According to this aspect of the disclosure, at least one of the touch points on the touch input device is associated with controlling a shutter function of the second camera to capture an image representing at least a portion of a scene within a field of view of the second camera.

According to one embodiment of the method, the method further includes upon a determination that no physical features are present within the field of view of the first camera, configuring the entire surface area of the touch input device to operate as the at least one touch point associated with controlling the shutter function.

According to one embodiment of the method, the method further includes upon a determination that no physical features are present within the field of view of the first camera, configuring a majority portion of the surface area of the touch input device to operate as the at least one touch point associated with controlling the shutter function, and configuring a remaining minority portion of the surface area of the touch input device to include a selection of touch points.

According to one embodiment of the method, the method further includes storing camera feature information for each touch point on the touch input device, and upon receipt of user touch input at a selected touch point, verbally presenting the camera feature information associated with the selected touch point to the user.

According to one embodiment of the method, the method further includes upon a determination that physical features are present within the field of view of the first camera, configuring the touch input device to include a plurality of touch points that are associated with controlling respective functions of the second camera.

According to one embodiment of the method, the physical features include one or more facial features of the user.

According to one embodiment of the method, the method further includes storing previously obtained user identity information including one or more facial features of the user; upon a determination that facial features are present within the field of view of the first camera, determining whether the present facial features match the one or more facial features included in the user identity information; and if a match is not made, configuring the entire surface of the touch input device to operate as the at least one touch point associated with controlling the shutter function.

According to one embodiment of the method, the method further includes displaying a preview video signal that contains a representation of at least a portion of the scene that is within the field of view of the second camera, and analyzing the preview video signal to determine whether one or more physical features of the user are present within the field of view of the second camera.

According to one embodiment of the method, the method further includes upon a determination that physical features are not present within the field of view of the first camera and upon a determination that physical features are present within the field of view of the second camera, configuring the entire surface of the touch input device to operate as the at least one touch point associated with controlling the shutter function.

According to one embodiment of the method, the method further includes upon a determination that physical features are not present within the field of view of the first camera and upon a determination that physical features are not present within the field of view of the second camera, configuring the touch input device to include a plurality of touch points that are associated with controlling respective functions of the second camera.

According to one embodiment of the method, the method further includes storing previously obtained user identity information including one or more facial features of the user.

According to one embodiment of the method, the method further includes upon a determination that physical features are present within the field of view of the second camera, determining whether the physical features present within the field of view of the second camera match the one or more facial features included in the user identity information, and if a match is determined, configuring the entire surface of the touch input device to operate as the at least one touch point associated with controlling the shutter function.

According to one embodiment of the method, the field of view of the first camera has a generally opposite direction from the field of view of the second camera.

According to one embodiment of the method, the method further includes upon receipt of a user command to begin operation of the second camera, automatically starting operation of the first camera and the analysis of the video signal generated by the first camera.

According to one embodiment of the method, the functions of the second camera include at least one of a camera mode, a video mode, a flash setting, a zoom function, or a focus setting.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

The terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Embodiments will now be described with reference to the drawings, wherein like reference numerals are used to refer to like elements throughout. It will be understood that the figures are not necessarily to scale.

In the present document, some embodiments are described primarily in the context of a mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer (e.g., a laptop computer, a netbook, an ultra mobile personal computer (PC), etc.), a pager, a communicator, an electronic organizer, a personal digital assistant (PDA), a smartphone, a portable communication apparatus, a digital camera (e.g., a photo camera, a video camera, a compact camera, etc.), a global positioning system (GPS) device, etc.

Figure 1A:
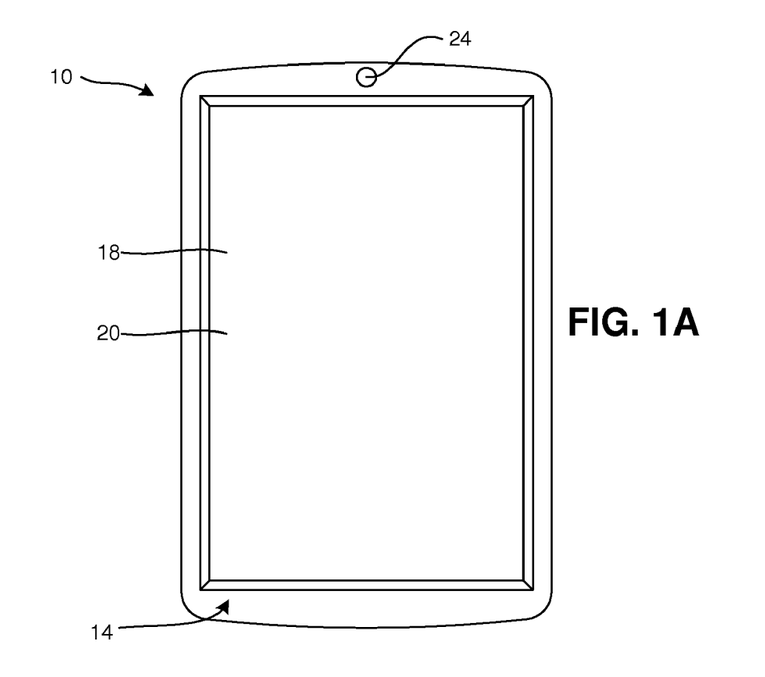
FIG. 1A is a schematic view of a mobile telephone as an exemplary electronic device in accordance with the present disclosure.
Figure 1B:
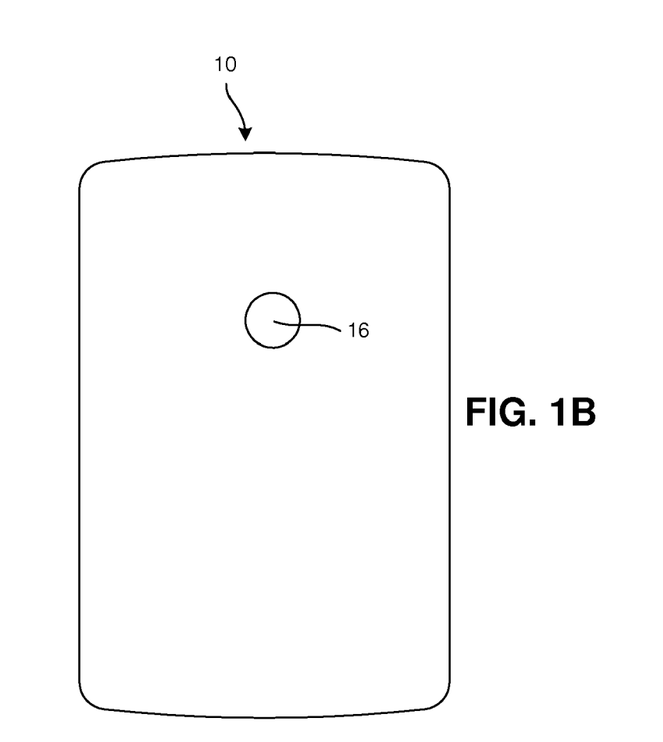
FIG. 1B is a schematic view of the back of the exemplary electronic device of FIG. 1A.
Figure 2:
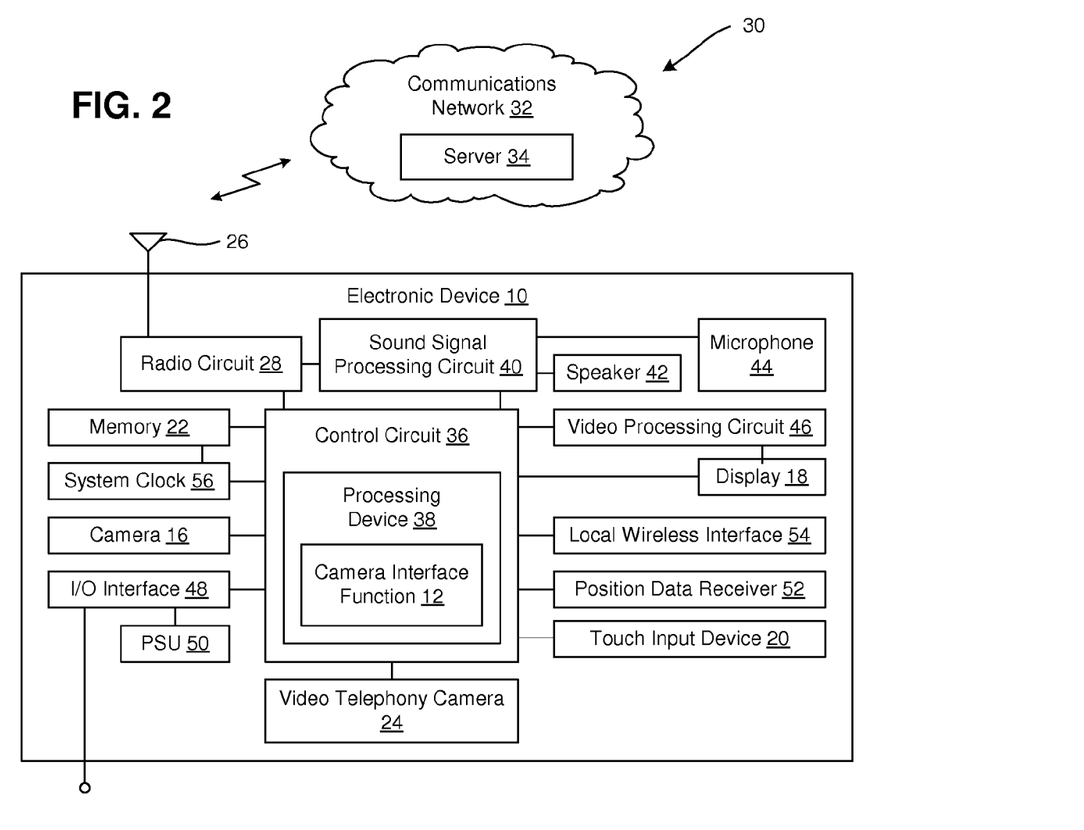
FIG. 2 is a schematic block diagram of the exemplary electronic device of FIG. 1A while operating as part of a communications system.

Referring initially to FIGS. 1A, 1B, and 2, an electronic device 10 is shown. In particular, FIG. 1A illustrates a front view of the electronic device 10, and FIG. 1B illustrates a back view of the electronic device 10. As can be seen, the electronic device 10 includes a camera interface function 12 (FIG. 2), a touch screen 14 located on the front of the electronic device 10 (FIG. 1A), and a camera 16 located on the back of the electronic device 10 (FIG. 1B). The camera interface function 12 is configured to change the functions and operations associated with the touch screen 14 during operation of the camera 16 based on whether or not a user is detected as facing the touch screen 14. For example, the camera interface function 12 may identify that the user is not facing the touch screen 14 when the user is facing the camera 16 in order to capture an image of oneself (e.g., a self portrait). In one embodiment, based on such identification, the camera interface function 12 may cause the touch screen 14 to operate in an optimized camera mode where the entire touch screen 14 may be used to control a shutter function of the camera 16. According to this embodiment, the user may "blindly" (e.g., without looking for a particular point) touch any portion of the touch screen 14 in order to select the shutter function and thereby, capture an image using the camera 16.

Additional details about the operation of the camera interface function 12 will be described in greater detail below. The camera interface function 12 may be embodied as executable code that is resident in and executed by the electronic device 10. In one embodiment, the camera interface function 12 may be a program stored on a computer or machine readable medium. The camera interface function 12 may be a stand-alone software application or form a part of a software application that carries out additional tasks related to the electronic device 10.

As illustrated in FIG. 1A, the touch screen 14 of the electronic device 10 may include a display 18 and a touch input device 20 located over the display 18. The display 18 displays information to a user such as operating state, time, telephone numbers, contact information, various menus, etc., that enable the user to utilize the various features of the electronic device 10. The display 18 also may be used to visually display content received by the electronic device 10 and/or retrieved from a memory 22 (FIG. 2) of the electronic device 10. The display 18 may be used to present images, video, and other graphics to the user such as, but not limited to, photographs, mobile television content, Internet pages, and video associated with games.

The touch input device 20 may include a transparent touch sensitive sensor that is able to recognize user touch input, to interpret a command represented by the touch input, and to communicate the command, via a corresponding output signal, to an appropriate device and/or application of the electronic device 10. A touch input may be used for various input purposes, such as selecting, writing, navigating, scrolling, moving a displayed item, etc. User touch input may include various touch motions using one or more fingers or fingertips, such as, for example, a tap, a pinch, a long press (e.g., holding a finger or fingertip on one point for a pre-determined amount of time), a release, and/or a dragging of the finger or fingertip in a direction across a portion of the sensor component of the touch input device 20, or any combination thereof.

As indicated in FIG. 1A, the display 18 and touch input device 20 may be used in conjunction with one another to implement touch screen functionality. A surface of the touch input device 20 may be thought of as being comprised of one or more touch points (not shown) for receiving user touch input associated with controlling one or more functions of the electronic device 10. The display 18 may display content to the user in the form of menus, representations of alphanumeric keys, links, and so forth, that form a graphical user interface for controlling various functions of the electronic device 10. Each item of displayed content may designate to the user the location of an associated touch point on the touch input device 20 and the particular function associated therewith. As such, the user may control a specific function of the electronic device 10 by touching a point on the touch input device 20 that is located directly above a desired item of displayed content. For example, the touch screen 14 may be used to provide a touch-based graphical user interface for controlling the camera 16.

The shape and size of an item of displayed content may determine the shape and size of the associated touch point. The number of touch points included in the touch input device 20 at a given time may depend on the number of functions that may be controlled via the graphical user interface that is displayed on the touch screen 14 at that time. And the current operational mode of the electronic device 10 (e.g., a camera mode) may determine which graphical user interface is displayed at a given time. In one embodiment, the touch input device 20 includes a touch point for each function that may be controlled via the currently displayed graphical user interface. For example, if the graphical user interface controls only one function of the electronic device 10, then the touch input device 20 may include only one touch point.

The exemplary illustration of FIG. 1A shows the display 18 and touch input device 20 as being bezel-set into a housing of the electronic device 10. It will be appreciated that the display 18 and touch input device 20 may be retained without a bezel so as to be substantially flush with the housing of the electronic device 10. Also, the illustrated electronic device 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The exemplary illustration of FIG. 1A also shows the electronic device 10 as not having any user input buttons or keys for text or navigation input. For example, the only button present on the electronic device 10 may be an on/off power button that is not visible from the view of FIG. 1A. In one embodiment, keys may be accessed by sliding, pivoting or turning a housing portion of the electronic device 10 to expose keys that are retained by another portion of the electronic device 10. These keys may be covered when the electronic device 10 is not opened in this manner. In another embodiment, the electronic device 10 may include a keypad (not shown) and/or buttons (not shown) that are adjacent to the touch screen 14 such that the touch screen 14 occupies only a portion of the front face of the electronic device 10. The keys, keypad, and/or buttons present in some embodiments may provide for a variety of user input operations, including call operations, messaging operations, Internet browsing, menu navigation, game playing, multimedia content playback, and so forth. For example, the keypad may include alphanumeric keys for allowing entry of alphanumeric information such as telephone numbers, phone lists, contact information, notes, text, etc. In addition, or in the alternative, the keys and/or buttons may include special function keys, such as a "call send" key for initiating or answering a call and a "call end" key for ending or "hanging up" a call. Other keys associated with the mobile telephone may include a volume key, an audio mute key, an on/off power key, a web browser launch key, etc.

The camera 16 may be any suitable imaging and/or video capturing device. The camera 16 may be arranged as a typical camera assembly that includes imaging optics to focus light from a portion of a scene that is within a field of view of the camera 16 onto a sensor. The sensor converts the incident light into image data. The camera 16 may include various optical components, such as a lens assembly, as well as other components commonly associated with cameras, such as focusing mechanics, optical zooming mechanics, a flash, a light meter, etc. Still image and/or video files corresponding to the pictures and/or movies captured by the camera 16 may be stored using the memory 22 or other electronic storage device (not shown).

During camera operation, the touch screen 14 may display content that represents various menu items commonly associated with camera operation, including, e.g., the shutter function, a camera/video mode, a start/stop function for recording video, a flash setting, a zoom amount, a focus setting, a self-timer, a brightness level, a white balance level, a resolution amount, a quality level, etc. The user may control the various features of the camera 16 by touching the appropriate touch points on the touch screen 14. For example, upon recognizing a touch input at the touch point associated with control of a shutter function of the camera 16, the touch input device 20 may command the camera 16 to capture an image representing the scene within the field of view of the camera 16 at that time. In one embodiment, the focus function may be controlled using a touch-to-focus feature that allows the user to set an image area that should be in focus while capturing the image by touching the desired image area on the touch screen 14.

It will be understood that the camera 16 may generate output image data at a predetermined frame rate to generate a preview video signal that is supplied to the display 18 for operation as an electronic viewfinder. The preview video signal generated by the camera 16 and displayed on the display 18 provides the user with a dynamically updated representation of an image of the scene within the field of view of the camera 16. As such, the user may be able to preview the image to be captured before selecting the shutter function of the camera 16. In one embodiment, the preview video signal may be presented on the display 18 in conjunction with the graphical user interface for controlling camera operation. For example, the content associated with the graphical user interface may be displayed in one or more peripheral areas of the display 18, such that a substantial majority of the display area is occupied by the electronic viewfinder images. Alternatively, at least a portion of the graphical user interface may overlay the electronic viewfinder images in a semi-transparent manner.

Typically, the display 18 is on an opposite side of the electronic device 10 from the camera 16, as illustrated in FIGS. 1A and 1B. In this manner, a user may point the camera 16 in a desired direction and view a representation of the field of view of the camera 16 on the display 18. As such, the camera 16 may have a point of view, or perspective. The point of view is a combination of a location of the camera 16 and a direction in which the camera 16 is aimed by the user. The point of view of the camera 16, in combination with characteristics of the imaging optics and optical settings of the camera 16, such as an amount of zoom, establish the field of view of the camera 16.

As illustrated in FIGS. 1A and 1B, in addition to the camera 16, the electronic device 10 may include an imaging device 24 that is located adjacent to the touch screen 14. The imaging device 24 of the illustrated embodiment is a camera that is directed toward the user while the user views the touch screen 14. These types of cameras are available on some mobile telephones to facilitate video telephone calls (also referred to as video telephony). Therefore, the imaging device 24 may also be referred to as a video telephony camera 24 herein. The imaging device 24 may generate a video signal containing a representation of objects in a field of view of the imaging device 24. Typically, the field of view of the imaging device 24 has a generally opposite direction from the field of view of the camera 16.

In one embodiment, the video signal generated by the video telephony camera 24 may be analyzed by the camera interface function 12 to identify a user based on detected physical features (e.g., facial or otherwise) using a user detection algorithm. The user detection algorithm may include a face detection algorithm, a face recognition algorithm, a silhouette detection algorithm, and/or any other type of technique capable of detecting the presence of a user. An identification of physical features may indicate that a user is facing the touch screen 14. Conversely, if no physical features are detected, then an assumption may be made that the user is not facing the touch screen 14. For example, the camera interface function 12 may be unable to identify any facial or other physical features when the user is facing the camera 16 on the backside of the electronic device 10. Additional detail regarding user detection techniques will be described below with respect to FIG. 3.

In the illustrated embodiment, the camera 16 and the imaging device 24 are shown as being built into the electronic device 10. In one embodiment, the camera 16 and/or the imaging device 24 may be a device accessory that is connected to the electronic device 10 by, for example, wired (e.g., USB, cable, etc.) or wireless connection. For example, the imaging device 24 may be a web camera or the like that is physically mounted on and coupled to the electronic device 10. Alternatively, the imaging device 24 may be a wireless web camera that is operatively coupled to the electronic device 10. As another example, the camera 14 and/or imaging device 24 may be installed in the electronic device 10 as an after-market addition to the device 10.

With continued reference to FIG. 2, features of the electronic device 10 when implemented as a mobile telephone will be described. The electronic device 10 includes communications circuitry that enables the electronic device 10 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 22, executing applications to allow user interaction with the data, displaying video and/or image content associated with the data, outputting audio sounds associated with the data, and so forth.

In the exemplary embodiment of FIG. 2, the communications circuitry may include an antenna 26 coupled to a radio circuit 28. The radio circuit 28 includes a radio frequency transmitter and receiver for transmitting and receiving signals via the antenna 26. In this manner, the radio circuit 28 may be configured to operate in a mobile communications system 30. Radio circuit types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 26 and the radio circuit 28 may represent one or more than one radio transceiver.

As illustrated in FIG. 2, the mobile communications system 30 may include a communications network 32 having a server 34 (or servers) for managing calls placed by and destined to the electronic device 10, transmitting data to and receiving data from the electronic device 10 and carrying out any other support functions. The server 34 communicates with the electronic device 10 via a transmission medium. The transmission medium may be any appropriate device or assembly, including, for example, a communications base station (e.g., a cellular service tower, or "cell" tower), a wireless access point, a satellite, etc. The communications network 32 may support the communications activity of multiple electronic devices 10 and other types of end user devices. As will be appreciated, the server 34 may be configured as a typical computer system used to carry out server functions and may include a processor configured to execute software containing logical instructions that embody the functions of the server 34 and a memory to store such software. In alternative arrangements, the electronic device 10 may wirelessly communicate directly with another electronic device 10 (e.g., another mobile telephone or a computer) and without an intervening network.

Continuing to refer to FIG. 2, the electronic device 10 may include a primary control circuit 36 that is configured to carry out overall control of the functions and operations of the electronic device 10. The control circuit 36 may include a processing device 38, such as a central processing unit (CPU), microcontroller, or microprocessor. The processing device 38 executes code stored in a memory (not shown) within the control circuit 36 and/or in a separate memory, such as the memory 22, in order to carry out operation of the electronic device 10. For instance, the processing device 38 may execute code that implements the camera interface function 12. The memory 22 may be, for example, one or more of a buffer, a flash memory, a hard drive, a removable media, a volatile memory, a non-volatile memory, a random access memory (RAM), or other suitable device. In a typical arrangement, the memory 22 may include a non-volatile memory for long-term data storage and a volatile memory that functions as system memory for the control circuit 36. The memory 22 may exchange data with the control circuit 36 over a data bus. Accompanying control lines and an address bus between the memory 22 and the control circuit 36 also may be present.

The electronic device 10 may further include a sound signal processing circuit 40 for processing audio signals transmitted by and received from the radio circuit 28. Coupled to the sound signal processing circuit 40 are a speaker 42 and a microphone 44 that enable a user to listen and speak via the electronic device 10. The radio circuit 28 and sound processing circuit 40 are each coupled to the control circuit 36 so as to carry out overall operation. Audio data may be passed from the control circuit 36 to the sound signal processing circuit 40 for playback to the user. The audio data may include, for example, audio data from an audio file stored by the memory 22 and retrieved by the control circuit 36, or received audio data, such as in the form of voice communications or streaming audio data from a mobile radio service. The sound signal processing circuit 40 may include any appropriate buffers, decoders, amplifiers, and so forth.

The display 18 may be coupled to the control circuit 36 by a video processing circuit 46 that converts video data to a video signal used to drive the display 18. The video processing circuit 46 may include any appropriate buffers, decoders, video data processors, and so forth. The video data may be generated by the control circuit 36, retrieved from a video file that is stored in the memory 22, derived from an incoming video data stream that is received by the radio circuit 28, or obtained by any other suitable method.

As indicated in FIG. 2, the electronic device 10 may further include one or more input/output (I/O) interface(s) 48. The I/O interface(s) 48 may be in the form of a typical mobile telephone I/O interface and may include one or more electrical connectors. The I/O interface(s) 48 may form one or more data ports for connecting the electronic device 10 to another device (e.g., a computer) or an accessory (e.g., a personal handsfree (PHF) device) via a cable. Further, operating power may be received over the I/O interface(s) 48 and power to charge a battery of a power supply unit (PSU) 50 may be received over the I/O interface(s) 48.

The electronic device 10 also may include various other components. For instance, a position data receiver, such as a global positioning system (GPS) receiver 52, may be involved in determining the location of the electronic device 10. A local wireless interface device 54, such as an infrared transceiver and/or an RF transceiver (e.g., a Bluetooth chipset) may be used to establish communication with a nearby device, such as an accessory (e.g., a PHF device), another mobile radio terminal, a computer or another device. The electronic device 10 also may include a system clock 56 for clocking the various components of the electronic device 10, such as the control circuit 36 and the memory 22.

Referring back to the camera interface function 12, any of a number of user detection techniques may be used to carry out the functions and operations described herein. For example, any suitable face detection and/or face recognition technique may be used as part of determining whether a user is facing the touch screen 14 in accordance with the present invention. Face detection, for example, may be carried out using binary pattern classification where the output of the video telephony camera 24 is transformed into features and a classifier decides whether the image contains a face or some other body part, such as a torso or a hand.

Figure 3:
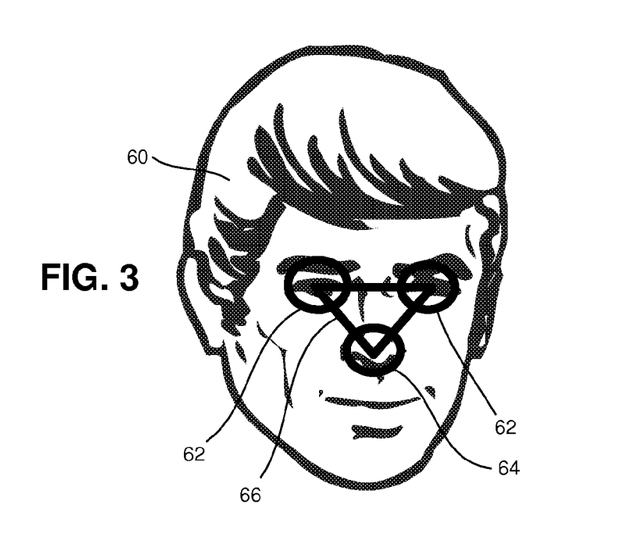
FIG. 3 is a schematic view of an image of a user's face that has been processed to determine whether the user is facing the touch screen.

With additional reference to FIG. 3, one exemplary face detection technique identifies a face 60 by analyzing image data from the video stream that is generated by the video telephony camera 24 to detect the presence of a pair of eyes 62 located symmetrically about the bridge of the nose 64. One technique for determining symmetry of the eyes 62 with respect to the nose 64 is to form a structural relationship between the detected facial features. FIG. 3 schematically represents the face 60 of a user that has been detected by the presence of these features. In the illustrated embodiment, a triangle 66 may be formed by connecting the locations of the eyes 62 and tip of the nose 64. If, for example, the triangle 66 is an isosceles triangle, the camera interface function 12 may determine that the eyes 62 are symmetrically located about the nose 64 and thus, a face 60 is present in the field of view of the video telephony camera 24.

In one embodiment, the video signal from the video telephony camera 24 may be used for face recognition (e.g., ascertaining an identity of the user). An identity of the user of the electronic device 10 may be obtained by the camera interface function 12 during an initialization process. The user's identity may be stored in, for example, the memory 22 and retrieved to carry out the camera interface function 12 as described herein. Exemplary facial recognition techniques that could be employed include eigenface, fisherface, the Hidden Markov Model, neuronal motivated dynamic link matching, and three-dimensional face recognition. The use of face recognition as a user detection technique may be preferred in certain scenarios. For example, face recognition techniques may be used to verify, or confirm, that an object identified as the user is, in fact, the user and not a third party. For instance, in a crowded area, even though the user is facing the camera 16, the camera interface function 12 may mistakenly identify as the user a member of the crowd that is within the field of view of the video telephony device 24.

Instead of, or in addition to, face detection and/or face recognition, whether a user is facing the touch screen 14 may be determined based on the identification of physical features and/or body parts, such as, e.g., part of the face, neck, shoulders, and/or upper body. In one embodiment, the camera interface function 12 may use a silhouette detection algorithm to analyze the video signal generated by the video telephony camera 24. By identifying physical features and/or body parts of the user, the camera interface function 12 may be able to detect the user even when the user's face is turned or at an angle relative to the optical axis of the field of view of the video telephony camera 24. For example, the user may have tilted the camera away from the user's face while looking at the touch screen 14. Or the user may have positioned the camera so that it is not centered directly in front of the user's face.

It will be appreciated that other techniques may be employed for determining whether or not the user is facing the touch screen 14. For example, based on the video signal generated by the video telephony camera 24, the camera interface function 12 may measure, e.g., facial expressions, shape of eyes, shape of mouth, eye movement, changes in skin around a user's eyes, eye characteristics, etc., in order to determine whether or not a user is facing the video telephony camera 24 and therefore, the touch screen 14. In addition, or in the alternative, the camera interface function 12 may analyze the video signal generated by the video telephony camera 24 to identify moving objects within the image field that are characteristically human, and thus, indicative of the user's presence within the field of view of the video telephony camera 24. Alternatively, based on the video signal generated by the video telephony camera 24, the camera interface function 12 may be able to determine that a user is facing the touch screen 14 when an object captured by the video signal occupies a pre-determined amount of the field of view of the video telephony camera 24. For example, when the user is looking at the touch screen 14, the user's face will typically take up a majority (e.g., more than half) of the field of view of the video telephony camera 24 because the user is the closest object to the video telephony camera 24.

Based on whether a user is detected as being present within an image field, the camera interface function 12 may control the mode in which the touch screen 14 will operate. In one embodiment, if a user is not detected as facing the camera 16, the touch screen 14 may be set to operate in an optimized camera mode where, for example, all the touch points on the touch screen 14 may be associated with controlling only the shutter function of the camera 16. On the other hand, if a user is detected by the camera interface function 12, the touch screen 14 may be set to operate in a general camera mode where, for example, the touch points on the touch screen 14 may be associated with controlling various features of the camera 16.

Through the following description, exemplary techniques for capturing an image using a touch screen device that has user detection based functionality are described. It will be appreciated that through the description of the exemplary techniques, a description of steps that may be carried out in part by executing software is described. The described steps are the foundation from which a programmer of ordinary skill in the art may write code to implement the described functionality. As such, a computer program listing is omitted for the sake of brevity. However, the described steps may be considered an algorithm that the corresponding devices are configured to carry out.

Also, it will be apparent to a person having ordinary skill in the art of computer programming, and specifically in application programming for cameras, mobile telephones, and/or other electronic devices, how to program the electronic device 10 to operate and carry out logical functions associated with the camera interface function 12. Accordingly, details as to specific programming code have been left out for the sake of brevity. Also, while the functions may be executed by respective processing devices in accordance with an embodiment, such functionality could also be carried out via dedicated hardware or firmware, or some combination of hardware, firmware, and/or software.

Figure 4:
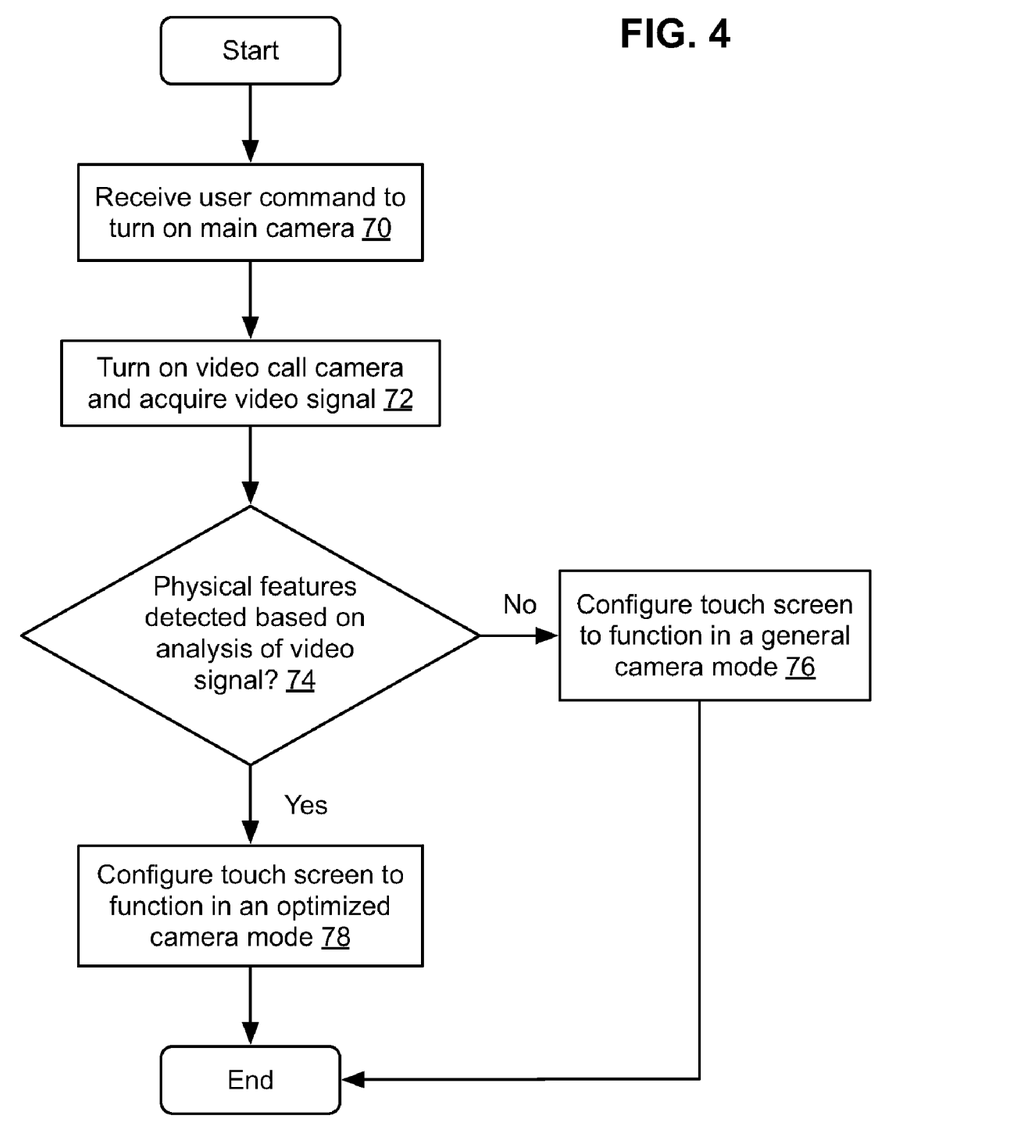
FIG. 4 is a flow chart representing an exemplary method of changing the functionality of a touch screen during camera operation using the exemplary electronic device of FIG. 1A.

With additional reference to FIG. 4, illustrated are logical operations to implement an exemplary method of changing the functionality of a touch screen during camera operation. The exemplary method may be carried out by executing an embodiment of the camera interface function 12, for example. Thus, the flow chart of FIG. 4 may be thought of as depicting steps of a method carried out by the electronic device 10. Although FIG. 4 shows a specific order of executing functional logic blocks, the order of executing the blocks may be changed relative to the order shown. One of ordinary skill in the art will appreciate that the logical operations may be configured to occur automatically and/or may be enabled and disabled based on user interaction. Also, two or more blocks shown in succession may be executed concurrently or with partial concurrence. Certain blocks also may be omitted.

As illustrated in FIG. 4, the logical flow for the camera interface function 12 may begin in block 70 where a user command to turn on a camera 16 is received. The user may input a command to turn on the camera 16 by, for example, touching a designated touch point on a touch screen 14 of the electronic device 10. In one embodiment, the touch input device 20 of the touch screen 14 may receive the user touch input and provide a command signal to the control circuit 36. In response to the command signal, the control circuit 36 may activate the camera 16 and inform the camera interface function 12 of the received command. Once activated, the camera 16 may generate a preview video signal that may be provided to the display 18 for electronic viewfinder operation.

At block 72, upon receipt of a command to turn on the camera 16, the camera interface function 12 may automatically turn on a video telephony camera 24. Once activated, the video telephony camera 24 may be configured to generate a video signal that includes a dynamically updated representation of a portion of the scene within the field of view of the video telephony camera 24. The camera interface function 12 acquires the video signal generated by the video telephony camera 24. As indicated above, the video signal generated by the video telephony camera 24 may represent a field of view that has a generally opposite direction from the field of view of the preview video signal generated by camera 16 and displayed on the electronic viewfinder. As such, if the user is facing the video telephony camera 24, the video signal generated by the video telephony camera 24 may include a representation of the user. Conversely, if the user is facing the camera 16, the preview video signal generated by the camera 16 may include a representation of the user.

At block 74, the video signal generated by the video telephony camera 24 is analyzed by the user detection algorithm of the camera interface function 12 to determine whether any physical features (e.g., facial or otherwise) may be identified within the image field. The identification of physical features may indicate that the user is present within the image field and therefore, for example, facing the touch screen 14 located on the front side of the electronic device 10. On the other hand, a lack of identifiable physical features may indicate that the user is not within the image field, and therefore, for example, facing the camera 16 located on the opposite side of the electronic device 10 from the touch screen 14.

In one embodiment, the user detection process of block 74 may last a predetermined amount of time, until the camera interface function 12 has identified the presence of a user in the image field, or until a determination has been made that no user is present in the image field. Periodic updates to the determination of block 74 may be made. For instance, every five seconds, or less, the user detection process may be carried out to revise the user detection determination. Also, the time required to carry out the user detection process of block 74 may be short enough such that the user perceives little or no delay between the input of a command to turn on the camera 16 and the display of a graphical user interface on the touch screen 14 that corresponds to the current operational mode of the camera 16 (e.g., general camera mode or optimized camera mode).

At block 76, if a determination is made that physical features are present within the image field, then the camera interface function 12 may control the functionality of the touch screen 14 by arranging the touch screen 14 to operate in a general camera mode. In one embodiment, during operation in the general camera mode, the touch screen 14 allows the user to control various features of the camera 16 including, e.g., the shutter function, the flash, a zoom amount, a focus setting, and/or other features commonly associated with typical camera operation. The camera interface function 12 may control the content displayed on the display 18 so that a graphical user interface for controlling the various features of the camera 16 is presented to the user. And the camera interface function 12 may control the shape and size of the touch points on the touch screen 14 according to the shape and size of the appropriate displayed content. As such, when the touch screen 14 is operating in the general camera mode, the user may control one of a plurality of camera features by touching a specific point on the touch screen 14 that is designated as representing a desired camera feature.

At block 78, if a determination is made that physical features are not present within the image field, then the camera interface function 12 may control the functionality of the touch screen 14 by arranging the touch screen 14 to operate in an optimized camera mode. In one embodiment, during operation in the optimized camera mode, the entire touch screen 14 functions as a touch point for controlling a shutter function of the camera 16. For example, the camera interface function 12 may control the content displayed on the display 18 such that a graphical user interface for controlling only the shutter function is presented to the user. And the camera interface function 12 may configure the touch screen 14 to include only one touch point that covers the entire area of the touch screen 14. As such, when the touch screen 14 is operating in the optimized camera mode, the user may control the shutter function by "blindly" (e.g., without looking) touching any area on the touch screen 14.

Figure 5:
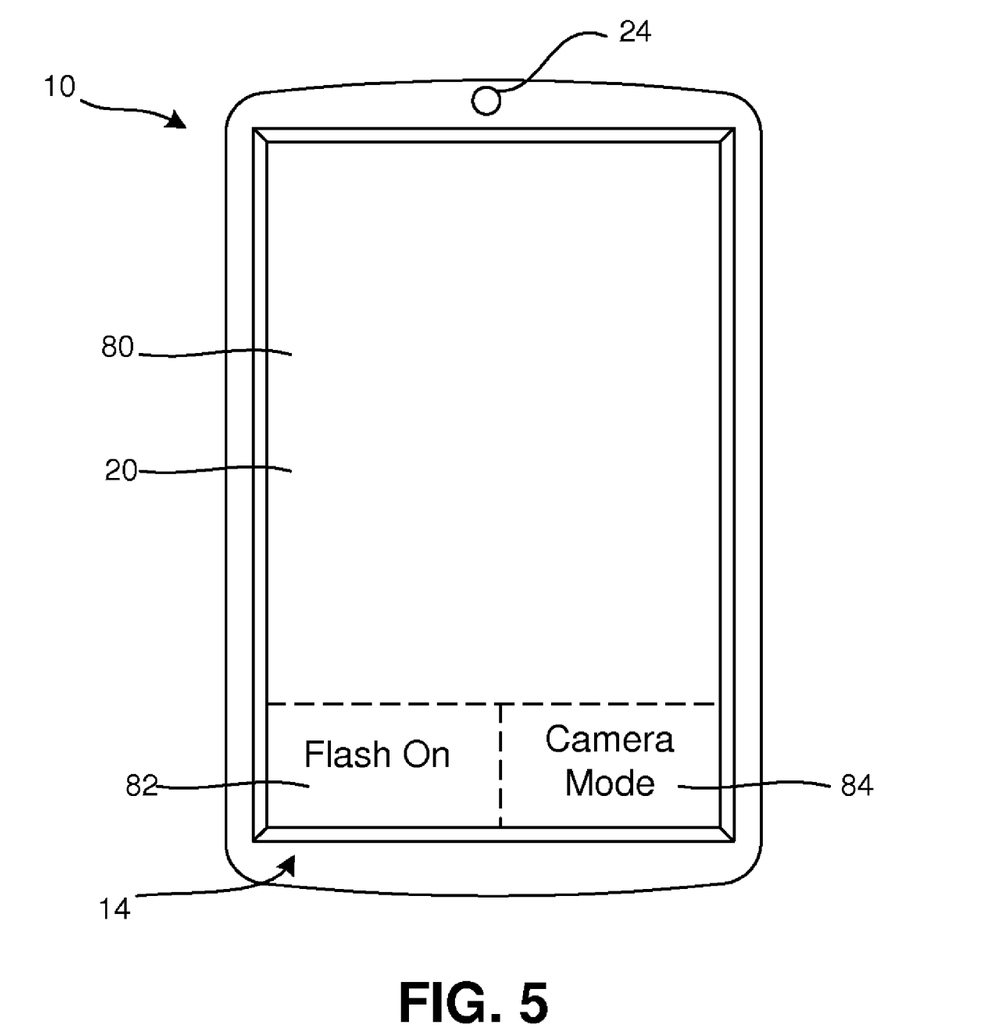
FIG. 5 is a schematic view of the mobile telephone of FIG. 1A where the display represents an exemplary user interface in accordance with the present disclosure.

With additional reference to FIG. 5, in one embodiment, the camera interface function 12 may be configured to arrange the touch screen 14 such that one or more camera features (e.g., flash on/off, video/camera mode, etc.), in addition to the shutter function, may be controllable via user touch input while operating in the optimized camera mode. As shown in FIG. 5, the touch input device 20 may be thought of as having a surface area that is divided into several touch zones (e.g., 80, 82, 84), where each touch zone is configured to receive user input associated with a specific camera feature. For example, at least one touch zone (e.g., 80) may be designated as including the touch point associated with controlling the shutter function. And one or more touch zone(s) (e.g., 82, 84) may be designated as including touch points associated with controlling one or more additional camera feature(s). FIG. 5 shows an exemplary embodiment of the electronic device 10 where the surface area of the touch input device 20 has been divided into a shutter touch zone 80, a flash touch zone 82, and a camera/video touch zone 84. As illustrated, the shutter touch zone 80 is substantially larger than the remaining touch zones 82, 84. This enables the user to easily locate the shutter touch zone 80 even when other camera features may be controlled via the touch screen 14. For example, the shutter touch zone 80 may constitute at least three-fourths (¾) of the surface area of the touch input device 20.

Each of the touch zones may be labeled with text, images, and/or symbols, or any combination thereof, to identify the associated camera feature. The labels may also indicate a current setting of the camera feature. For example, in the flash touch zone 82, the displayed text may indicate whether the flash is on or off. And in the camera/video touch zone 84, the displayed text may indicate whether the camera 16 is operating in a still camera mode or a video camera mode. In one embodiment, while the camera 16 is operating in a video mode, the flash touch zone 82 may disappear from the touch screen 14. For example, the flash touch zone 82 may be merged with the camera/video touch zone 84 to create one touch zone for receiving user input associated with controlling the camera/video mode of the camera 16. Once the camera 16 is changed back to a still camera mode, the flash touch zone 82 may reappear on the touch screen 14.

It will be appreciated that each of the touch zones of the touch screen 14 may be associated with any one of the camera features of the camera 16, or any other operation of the electronic device 10. Furthermore, the touch zones may be of any shape or size within the dimensions of the touch screen 14 and are not limited to the particular features of the touch zones 80, 82, and 84 shown in FIG. 5. In one embodiment, the shape and size of a given touch zone may depend on the shape and size of the label that represents the touch zone. For illustrative purposes only, dotted lines are used to denote the boundaries of the touch zones 80, 82 and 84; however, it will be appreciated that these lines may not be displayed as part of the graphical user interface presented to the user.

In one embodiment, upon receiving a user input at a touch point corresponding to the one or more camera features presented on the touch screen 14, the camera interface function 12 may verbally present (e.g., speak) information about the corresponding camera feature to the user. The user input may be a touch input as described above. In addition, or in the alternative, the touch input device 20 may be configured to recognize the hovering of a finger above or near a touch point as a user input. The verbal presentation of information may be achieved by using, for example, a text to speech application. A database (e.g., look-up table) may be constructed to include camera feature information for each touch point on the touch screen 14. The camera feature information may include, for example, the name of the camera feature (e.g., flash) and/or the options associated with the camera feature (e.g., flash on/off). Upon receiving user input at a specific touch point, the camera interface function 12 may retrieve the camera feature information associated with the selected touch point and provide this information to the text to speech application. For example, upon placing a finger in the flash touch zone 82, the user may hear the words "flash on," thereby indicating to the user that the flash of the camera 16 is turned on. Similarly, upon placing a finger in the camera/video touch zone 82, the user may hear the words "camera mode," thereby indicating to the user that the camera 16 is operating in a still camera mode. As such, the camera interface function 12 may enable the user to navigate between camera features presented on the touch screen 14 without looking at the display 18. This further facilitates the user's ability to blindly access the touch screen 14.

In some situations, the user may not want to use the touch screen 14 in an optimized camera mode and/or may prefer to conserve battery power by turning off the video telephony camera 24 when the optimized camera mode is not needed. In one embodiment, to provide the user with greater flexibility in controlling camera operations, upon activation of the camera 16, the touch screen 14 may automatically present a graphical user interface that provides the user with the option of choosing between normal camera operation and user detection based camera operation. During normal camera operation, the electronic device 10 may not use the user detection technique of the camera interface function 12, as described herein, and therefore, the video telephony camera 24 may not be activated until further user input is received. During user detection based camera operation, on the other hand, the electronic device 10 may automatically activate the video telephony camera 24 in order to carry out the user detection techniques described herein. Alternatively, or in addition, the user may toggle between normal camera operation and user detection based camera operation at any time while using the camera 16 by selecting an option from a list of menu items.

In one embodiment, in addition to the user detection techniques described above, a preview video signal generated by the camera 16 may be analyzed by the camera interface function 12 to confirm or verify that the user is in fact facing the camera 16 and not the display 18. For example, at block 74 of FIG. 4, based on an analysis of the video signal generated by the video telephony camera 24, the camera interface function 12 may determine that there are no identifiable physical features in the image field of the video telephony camera 24, thereby indicating that the user is not facing the display 18. According to the present embodiment, the camera interface function 12 also may analyze a preview video signal generated by camera 16 to determine whether the physical features may be identified in the image field of the camera 16. The identification of physical features in the image field of the camera 16 may confirm that the user is not facing the display 18, but rather, is facing the camera 16. As such, by basing the user detection process on two different video signals from opposite points of view, the camera interface function 12 may be able to verify that the user is in fact trying, for example, to take a picture of oneself using the camera 16.

The above embodiment may be preferred in situations where the user is not within the field of view of the video telephony camera 24 but would still like to view and access the feature-rich user interface that is available when the touch screen 14 is operating in a general camera mode. For example, when the electronic device 10 is held above the user's head, the user's physical features may not be within the field of view of the video telephony camera 24; however, from the user's standpoint below the electronic device 10, the camera user interface displayed on the touch screen 14 may still be visible and accessible. In such a situation, the user may prefer to have the touch screen 14 operate in a general camera mode, rather than an optimized camera mode where only the shutter function is available. By analyzing both the video signal of the camera 16 and the video signal of the video telephony camera 24, the camera interface function 12 is able to determine that the user is not within the field of view of either camera. Based on this determination, the camera interface function 12 may set the touch screen 14 to operate in a general camera mode.

In another embodiment, the camera interface function 12 may utilize a face recognition technique to confirm that the user is within the field of view of the camera 16. For example, the camera interface function 12 may analyze the preview video signal generated by the camera 16 to determine whether an object in the field of view of the camera 16 may be recognized as the face of the user. The use of face recognition as part of the user detection process may be preferred in a crowded area to ensure that a member of the crowd is not accidentally identified as the user. Also, the present embodiment may prevent the camera interface function 12 from identifying an object to be photographed as the user, where the user is not within the field of view of the video telephony camera 24.

In one embodiment, when the touch screen 14 is operating in an optimized camera mode, the camera interface function 12 may cause the entire touch screen 14 to function as a touch point for controlling the video record function of the camera 16. For example, the user may start recording a video of oneself by touching any area on the touch screen 14 and may stop recording the video by touching the touch screen 14 a second time. As such, the techniques described herein for facilitating, for example, the capture of a self-portrait may also be applied to facilitate the recording of, for example, a "self-video" or other video where the user is unable to view the touch screen 14 or otherwise ascertain the location of the touch point associated with the video record function.

In sum, the present disclosure provides an improved technique for taking pictures using an electronic device 10 with touch screen functionality. As described herein, the improved technique allows a user to easily access the shutter function on the touch screen 14 in situations where the user is unable to view the touch screen 14 to ascertain the location of an associated touch point. In addition, the present disclosure enables the user to access a feature-rich camera menu when taking a picture and/or video in a typical manner, e.g., when facing the touch screen 14, while also enabling a user to quickly and easily take a picture of one-self when facing the camera 16. Thus, as described herein, the functionality of the touch screen 14 may be automatically configured to satisfy the operational needs of the user at the time of capturing an image using the camera 16.

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
   a first camera that generates a video signal containing a representation of at least a portion of a scene within a field of view of the first camera;
   a second camera that captures an image upon receiving user input associated with controlling a shutter function of the second camera, the image representing at least a portion of a scene within a field of view of the second camera, and the field of view of the second camera having a generally opposite direction from the field of view of the first camera;
   a controller that acquires the video signal from the first camera and analyzes the video signal to determine whether one or more physical facial features of a user of the electronic device are present within the field of view of the first camera; and
   a touch screen operatively coupled to the controller and generally facing the same direction as the field of view of the first camera, the touch screen being configured to include one or more touch points for receiving user input on a surface area of the touch screen, and each touch point being associated with controlling a respective one of a plurality of functions of the second camera,
   wherein upon a determination that no physical facial features are present within the field of view of the first camera, the controller configures a majority of the surface area of the touch screen to operate as touch input for controlling the shutter function of the second camera.

2. The electronic device of claim 1, wherein upon a determination that no physical facial features are present within the field of view of the first camera, the controller configures the entire surface area of the touch screen to operate as touch input for controlling the shutter function.

3. The electronic device of claim 1, wherein upon a determination that no physical facial features are present within the field of view of the first camera, the controller configures a majority portion of the surface area of the touch screen to operate as touch input for controlling the shutter function and configures a remaining minority portion of the surface area of the touch screen to include a selection of touch points, each associated with a specific camera function.

4. The electronic device of claim 3, further comprising a database that includes camera feature information for each touch point on the touch screen,
wherein upon receipt of user touch input at a selected touch point, the camera feature information associated with the selected touch point is verbally presented to the user.

5. The electronic device of claim 1, wherein upon a determination that physical facial features are present within the field of view of the first camera, the controller configures the touch screen to include a plurality of touch points that are associated with controlling respective functions of the second camera.

6. The electronic device of claim 1, further comprising a memory that stores previously obtained user identity information including one or more facial features of the user,
wherein upon a determination that facial features are present within the field of view of the first camera, the controller retrieves the user identity information from the memory to determine whether the facial features present within the field of view of the first camera match the one or more facial features included in the user identity information.

7. The electronic device of claim 6, wherein if a match is not made, the controller configures the entire surface of the touch screen to operate as touch input for controlling the shutter function.

8. The electronic device of claim 1, further comprising a display disposed under the touch screen, the display being configured as a viewfinder to display a preview video signal that contains a representation of at least a portion of the scene that is within the field of view of the second camera,
wherein the controller is configured to analyze the preview video signal to determine whether one or more physical facial features of the user are present within the field of view of the second camera.

9. The electronic device of claim 8, wherein upon a determination that physical facial features are not present within the field of view of the first camera and upon a determination that physical facial features are present within the field of view of the second camera, the controller configures the entire surface of the touch screen to operate as touch input for controlling the shutter function.

10. The electronic device of claim 8, wherein upon a determination that physical facial features are not present within the field of view of the first camera and upon a determination that physical facial features are not present within the field of view of the second camera, the controller configures the touch screen to include a plurality of touch points that are associated with controlling respective functions of the second camera.

11. The electronic device of claim 8, further comprising a memory that stores previously obtained user identity information including one or more facial features of the user,
wherein upon a determination that physical facial features are present within the field of view of the second camera, the controller retrieves the user identity information and determines whether the physical facial features present within the field of view of the second camera match the one or more facial features included in the user identity information, and
if a match is made, the controller configures the entire surface of the touch screen to operate as touch points associated with controlling the shutter function.

12. The electronic device of claim 1, wherein upon receipt of a user command to begin operation of the second camera, the controller automatically begins operation of the first camera and the analysis of the video signal generated by the first camera.

13. The electronic device of claim 1, wherein the functions of the second camera include at least one of a camera mode, a video mode, a flash setting, a zoom function, or a focus setting.

14. A method of changing a touch screen functionality of an electronic device that includes a first camera, a second camera, and a touch screen, the method comprising:
acquiring a video signal containing a representation of at least a portion of a scene within a field of view of the first camera, the field of view of the first camera having a generally opposite direction from a field of view of the second camera;
analyzing the video signal to determine whether one or more physical facial features of a user of the electronic device are present within the field of view of the first camera, the touch screen generally facing the same direction as the field of view of the first camera; and
upon a determination that no physical facial features are present within the field of view of the first camera, configuring a majority of a surface area of the touch screen to operate as touch input for controlling a shutter function of the second camera to capture an image representing at least a portion of a scene within the field of view of the second camera, the touch screen having one or more touch points for receiving user input on the surface area of the touch screen and each touch point being associated with controlling a respective one of a plurality of functions of the second camera.

15. The method of claim 14, further comprising upon a determination that no physical facial features are present within the field of view of the first camera, configuring the entire surface area of the touch screen to operate as touch input for controlling the shutter function.

16. The method of claim 14, further comprising:
upon a determination that no physical facial features are present within the field of view of the first camera,
configuring a majority portion of the surface area of the touch screen to operate as touch input for controlling the shutter function, and
configuring a remaining minority portion of the surface area of the touch screen to include a selection of touch points, each associated with a specific camera function.

17. The method of claim 16, further comprising:
storing camera feature information for each touch point on the touch screen; and
upon receipt of user touch input at a selected touch point, verbally presenting the camera feature information associated with the selected touch point to the user.

18. The method of claim 14, further comprising upon a determination that physical facial features are present within the field of view of the first camera, configuring the touch screen to include a plurality of touch points that are associated with controlling respective functions of the second camera.

* * * * *